(12) United States Patent
Jose et al.

(10) Patent No.: US 12,437,482 B2
(45) Date of Patent: Oct. 7, 2025

(54) DISPLAYING AVATARS ON AN AUGMENTED REALITY (AR) LENS IN RESPONSE TO RECEIVING A COMMUNICATION NOTIFICATION

(71) Applicant: International Business Machines Corporation, Armonk, NY (US)

(72) Inventors: Reji Jose, Bangalore (IN); Sarbajit K. Rakshit, Kolkata (IN); Raghuveer Prasad Nagar, Kota (IN)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 17/967,724

(22) Filed: Oct. 17, 2022

(65) Prior Publication Data

US 2024/0127547 A1   Apr. 18, 2024

(51) Int. Cl.
| | |
|---|---|
| G06T 19/00 | (2011.01) |
| G06F 3/01 | (2006.01) |
| G06T 13/40 | (2011.01) |
| G06T 19/20 | (2011.01) |
| H04L 51/224 | (2022.01) |
| H04L 65/1069 | (2022.01) |

(52) U.S. Cl.
CPC .......... *G06T 19/006* (2013.01); *G06F 3/017* (2013.01); *G06T 13/40* (2013.01); *G06T 19/20* (2013.01); *H04L 51/224* (2022.05); *H04L 65/1069* (2013.01)

(58) Field of Classification Search
None
See application file for complete search history.

(56) References Cited

U.S. PATENT DOCUMENTS

| | | | |
|---|---|---|---|
| 6,118,861 A | 9/2000 | Gutzmann et al. | |
| 8,300,077 B2 | 10/2012 | Dunko | |
| 8,866,849 B1 | 10/2014 | Cho et al. | |
| 9,191,620 B1 | 11/2015 | Katzer et al. | |
| 9,832,588 B1 | 11/2017 | Norris et al. | |
| 2013/0038601 A1* | 2/2013 | Han ........................ | G06F 3/011 |
| | | | 345/473 |
| 2013/0258040 A1 | 10/2013 | Kaytaz et al. | |

(Continued)

FOREIGN PATENT DOCUMENTS

| | | |
|---|---|---|
| KR | 20040100658 A | 12/2004 |
| WO | 2022127670 A1 | 6/2022 |

*Primary Examiner* — Michael J Cobb
(74) *Attorney, Agent, or Firm* — Zilka-Kotab, P.C.

(57) ABSTRACT

A computer-implemented method according to one embodiment includes displaying an avatar associated with a second user on an augmented reality (AR) lens of a first communication device, in response to receiving, on the first communication device worn by a first user, a notification from a second communication device of the second user. The first user is monitored for a predetermined gesture. In response to a determination that the first user performs a first predetermined gesture, an action associated with the first predetermined gesture is performed by the first communication device. The method further includes outputting a response associated with the first predetermined gesture. The response indicates an availability of the first user to communicate with the second user.

20 Claims, 9 Drawing Sheets

(56) References Cited

U.S. PATENT DOCUMENTS

| | | | |
|---|---|---|---|
| 2014/0152758 A1* | 6/2014 | Tong | H04M 1/72439 |
| | | | 348/14.02 |
| 2018/0034867 A1* | 2/2018 | Zahn | G06F 3/011 |
| 2018/0095635 A1* | 4/2018 | Valdivia | G02B 27/0093 |
| 2018/0136465 A1* | 5/2018 | Chi | G06F 3/0416 |
| 2020/0014792 A1 | 1/2020 | Lyren et al. | |
| 2021/0286502 A1* | 9/2021 | Lemay | H04N 13/368 |
| 2021/0314440 A1* | 10/2021 | Matias | H04M 3/42136 |
| 2021/0385890 A1 | 12/2021 | Jiang et al. | |
| 2023/0130535 A1* | 4/2023 | Ma | G06T 13/40 |
| | | | 345/474 |
| 2023/0177776 A1* | 6/2023 | Bryant | G06F 3/017 |
| | | | 345/633 |
| 2023/0359320 A1* | 11/2023 | Huang | G06F 1/1654 |

\* cited by examiner

DISPLAYING AVATARS ON AN AUGMENTED REALITY (AR) LENS IN RESPONSE TO RECEIVING A COMMUNICATION NOTIFICATION

BACKGROUND

The present invention relates to communication devices, and more specifically, this invention relates to displaying an avatar on an augmented reality (AR) lens of a first communication device in response to receiving a communication notification from a second communication device.

Communication devices, e.g., a cellular phone, a tablet, a computer within a network, etc., often include multitasking features. These features allow a user to attend a first event, and while the user is attending the first event, be alerted to a second event. For example, while a user is attending to a phone call on a cellular phone with a first calling party, the user may receive a call on the same phone number by a second calling party. In some instances, a communication device of the second calling party outputs a busy dial tone in response to receiving a notice that the cellular phone of the user is in use. In some instances, the cellular phone of the user may display options in response to receiving a call from the second calling party while the user is attending the phone call with the first calling party. Such options may be, e.g., to accept the call, to keep the second caller waiting, to merge the two phone calls, to send a short message service (SMS) notification to the second caller, etc.

SUMMARY

A computer-implemented method according to one embodiment includes displaying an avatar associated with a second user on an augmented reality (AR) lens of a first communication device, in response to receiving, on the first communication device worn by a first user, a notification from a second communication device of the second user. The first user is monitored for a predetermined gesture. In response to a determination that the first user performs a first predetermined gesture, an action associated with the first predetermined gesture is performed by the first communication device. The method further includes outputting a response associated with the first predetermined gesture. The response indicates an availability of the first user to communicate with the second user.

A computer program product according to another embodiment includes a computer readable storage medium having program instructions embodied therewith. The program instructions are readable and/or executable by a processing circuit to cause the processing circuit to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
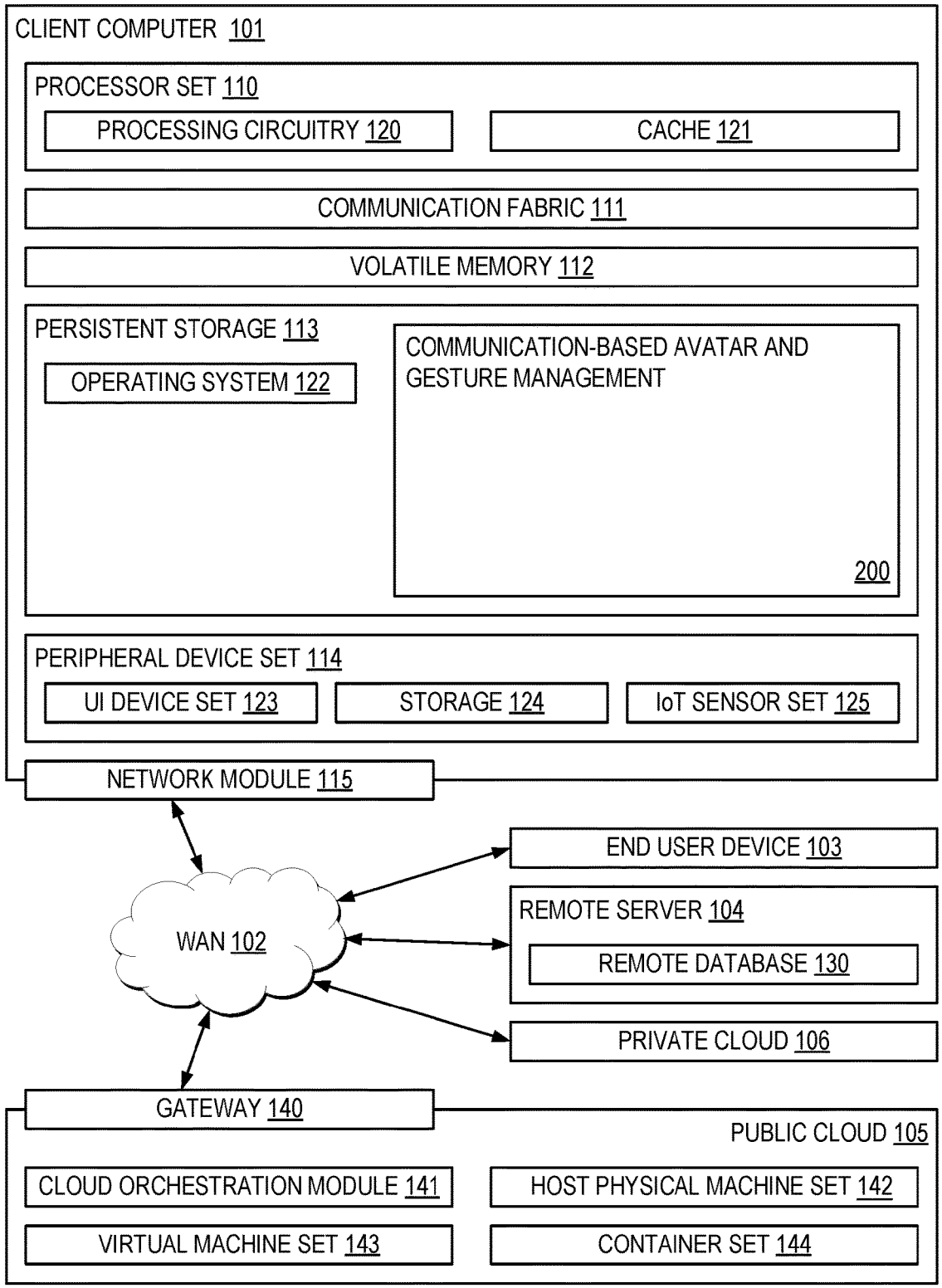
FIG. 1 depicts a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for displaying an avatar on an augmented reality (AR) lens of a first communication device in response to receiving a communication notification from a second communication device.

In one general embodiment, a computer-implemented method includes displaying an avatar associated with a second user on an augmented reality (AR) lens of a first communication device, in response to receiving, on the first communication device worn by a first user, a notification from a second communication device of the second user. The first user is monitored for a predetermined gesture. In response to a determination that the first user performs a first predetermined gesture, an action associated with the first predetermined gesture is performed by the first communication device. The method further includes outputting a response associated with the first predetermined gesture. The response indicates an availability of the first user to communicate with the second user.

In another general embodiment, a computer program product includes a computer readable storage medium having program instructions embodied therewith. The program instructions are readable and/or executable by a processing circuit to cause the processing circuit to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as communication-based avatar and gesture management of block 200 for displaying an avatar on an augmented reality (AR) lens of a first communication device in response to receiving a communication notification from a second communication device. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere herein, communication devices, e.g., a cellular phone, a tablet, a computer within a network, etc., often include multitasking features. These features allow a user to attend a first event, and while the user is attending the first event, be alerted to a second event. For example, while a user is attending to a phone call on a cellular phone with a first calling party, the user may receive a call on the same phone number by a second calling party. In some instances, a communication device of the second calling party outputs a busy dial tone in response to receiving a notice that the cellular phone of the user is in use. In some instances, the cellular phone of the user may display options in response to receiving a call from the second calling party while the user is attending the phone call with the first calling party. Such options may be, e.g., to accept the call, to keep the second caller waiting, to merge the two phone calls, to send an SMS notification to the second caller, etc.

Despite some conventional communication devices including multitasking features described above, there are issues that arise as a result of using such multitasking features. For example, while a call is in progress with a first calling party, the user may receive a call from a second party on the user's cellular phone. This causes the user to view the call notification on the cellular phone and then optionally take an action on the cellular phone, e.g., cancelling the call, keep waiting, sending an SMS, etc. Such actions take substantial effort from the user which can deviate the user from the ongoing call with the first calling party. For example, the user may traverse through a plurality of such optional actions displayed on a display of the user's cellular phone. In some instances, where the user is on a video call with the first calling party, the received call and response by the user may interrupt, e.g., pause, the video feed output to the second user, which breaks a context of an ongoing conversation, is potentially rude of the user to the first calling party, is time consuming without a benefit to the first calling party, etc. Furthermore, it should be noted that even assuming that the user is having a face to face conversation with a second user that does not include use of a communication device, various of these issues arise in response to the user receiving a call on the user's phone from a calling party. For example, the user taking their cellular phone out of their pocket to respond to the incoming call, e.g., forward the call to voicemail, text the calling party that the user is busy and will call back at a later time, etc., all ultimately break a context of an ongoing conversation, are potentially rude of the user to the first calling party, and are time consuming without a benefit to the first calling party. Accordingly, there is a need for a visual interface for responding to notifications with non-verbal communication.

In sharp contrast to the deficiencies described above, various embodiments and approaches described herein utilize visual interaction to improve the user experience in various of the situations described above, e.g., reacting to an incoming communication device call. More specifically, various embodiments and approaches described herein include a cognitive and augmented reality (AR) based techniques which detect visual interactions for responding to and/or reacting to incoming calls. For example, an avatar of a calling party may be displayed in AR glasses. From this, an action, e.g., hand gesture, eye gesture, etc., taken by a user wearing such glasses may be detected as a response to the avatar on the AR glasses.

Figure 2:
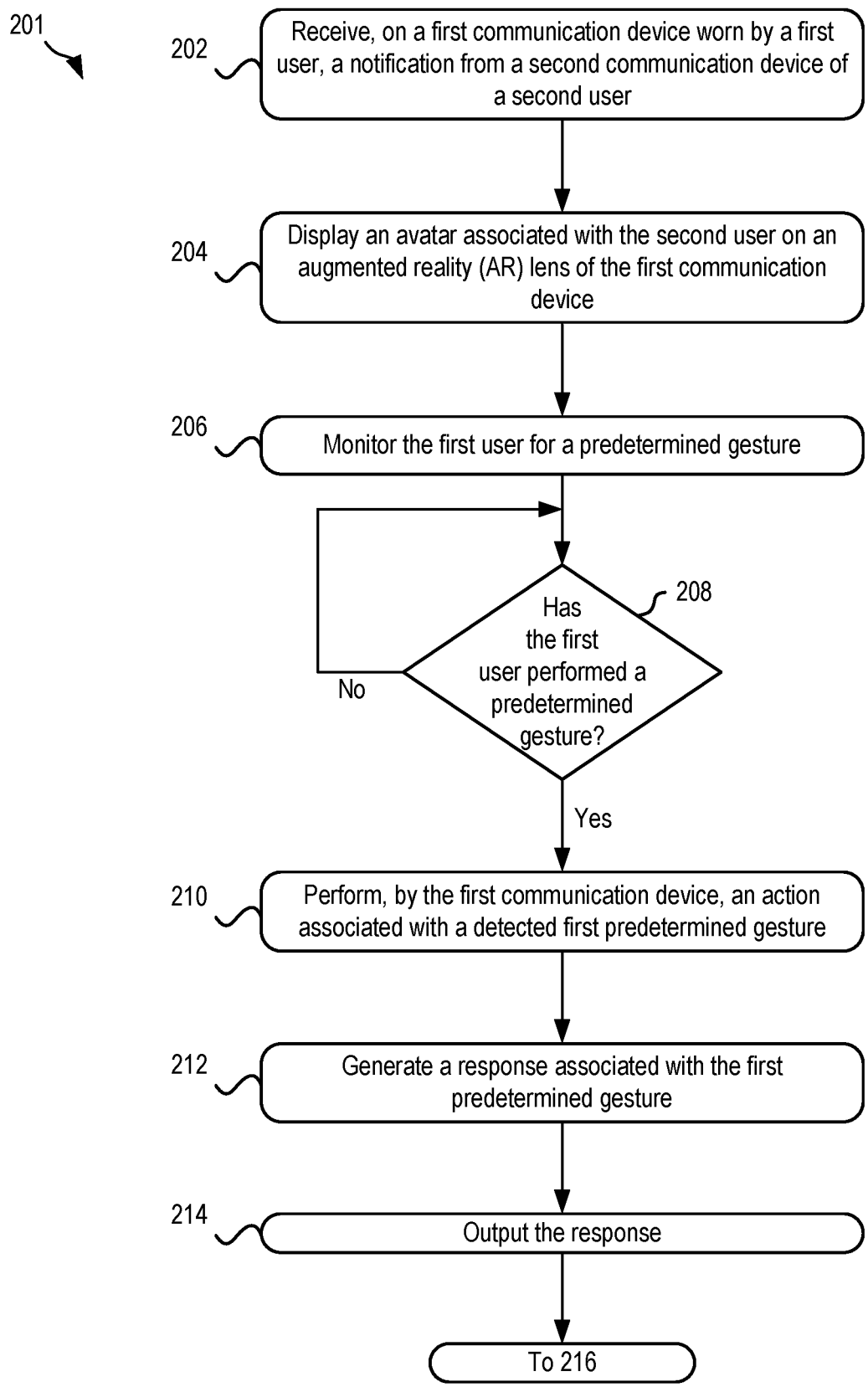
FIG. 2 depicts a flowchart of a method, in accordance with one embodiment of the present invention.
Figure 2:
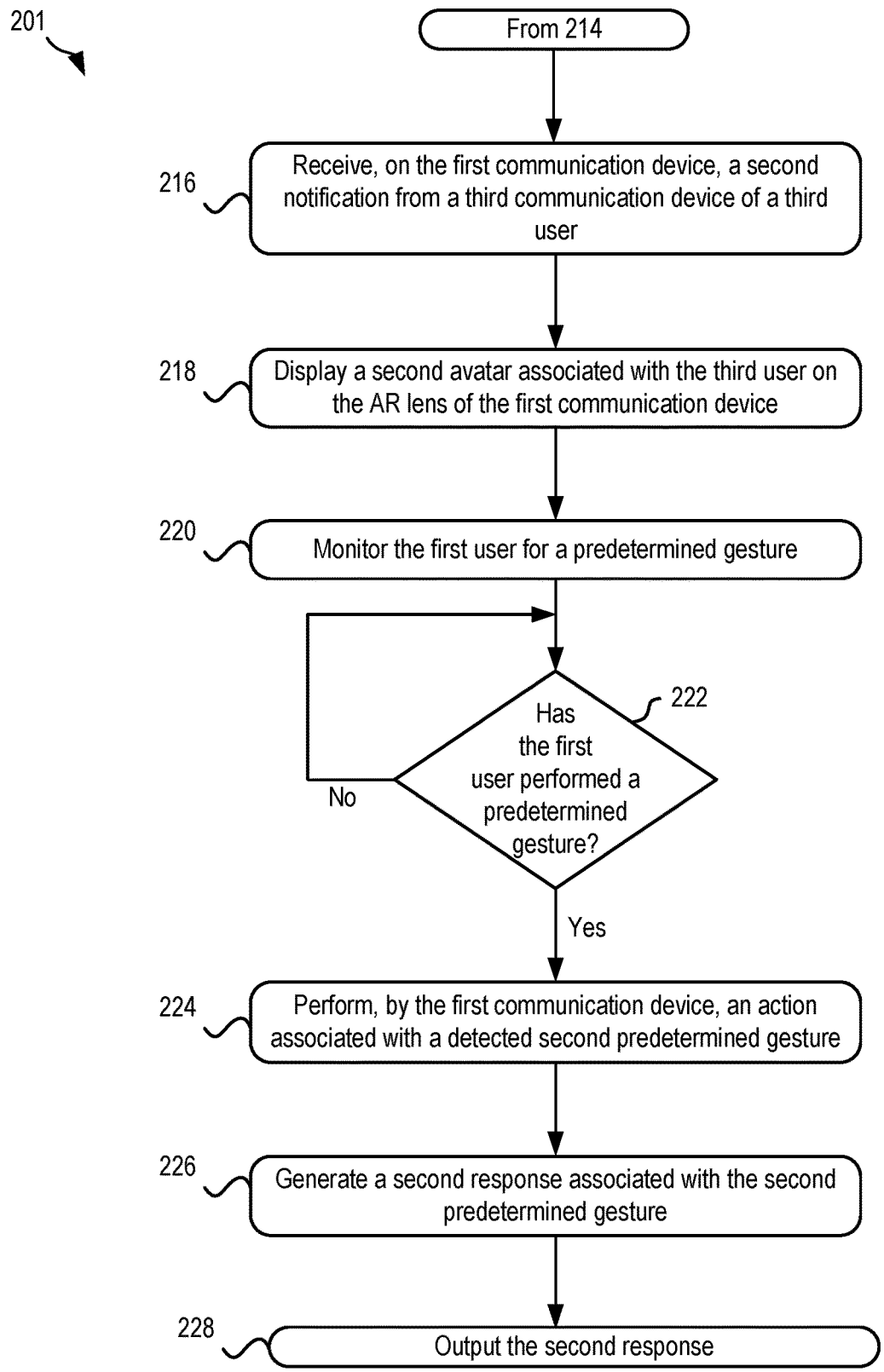

Now referring to FIG. 2, a flowchart of a method 201 is shown according to one embodiment. The method 201 may be performed in accordance with the present invention in any of the environments depicted in FIGS. 1-3L, among others, in various embodiments. Of course, more or fewer operations than those specifically described in FIG. 2 may be included in method 201, as would be understood by one of skill in the art upon reading the present descriptions.

Each of the steps of the method 201 may be performed by any suitable component of the operating environment. For example, in various embodiments, the method 201 may be partially or entirely performed by a processing circuit, or some other device having one or more processors therein. The processor, e.g., processing circuit(s), chip(s), and/or module(s) implemented in hardware and/or software, and preferably having at least one hardware component may be utilized in any device to perform one or more steps of the method 201. Illustrative processors include, but are not limited to, a central processing unit (CPU), an application specific integrated circuit (ASIC), a field programmable gate array (FPGA), etc., combinations thereof, or any other suitable computing device known in the art.

Operation 202 includes receiving, on a first communication device, a notification from a second communication device of a second user. The first communication device may be configured to be worn by a human being, and therefore in some approaches, may be worn by the first user. For example, the first communication device may be, e.g., a pair of AR glasses including one or more AR lenses, a pair of AR contact lenses, a virtual reality (VR) headset, etc. In some preferred approaches, a user is able to view through an AR lens to see what is beyond the AR lens, and one or more images such as avatars may be displayed and are viewable on the lens by a user wearing the first communication device. However, in one or more of such approaches, a user looking at the user wearing the first communication device, e.g., looking through an opposite side of the AR lens, sees through to the AR lens to the user's eye, e.g., where the lens is at least somewhat transparent. Accordingly, a user looking at the user wearing the first communication device preferably does not see anything displayed on the AR lens that the user wearing the first communication device is able to see on the AR lens. In one or more of such approaches, the first communication device may be designed similar to glasses, where the AR lens(es) are the lenses of the glasses. In some approaches the first communication device includes one or more speakers, e.g., earpieces, bone conduction headphones, audio speakers, etc. Furthermore, the first communication device may additionally and/or alternatively include a processing circuit with a cellular antenna that allows the first communication device to communicate with one or more other communication devices, e.g., where the first communication device is controlled via audio commands and/or narration on one or more lenses of the first communication device. In some alternative approaches, the first communication device may be connected, e.g., wirelessly and/or hardwired, to a second communication device that communicates with one or more other communication devices. For example, in one or more of such approaches, messages may be received from a third communication device by the second communication device, and the second communication device may relay, e.g., via a wireless pairing connection, the messages to the first communication device.

The notification received from the second communication device of the second user may be a request to communicate with the first communication device. More specifically the notification received from the second communication device of the second user may be a request from the second user to communicate with the first user, e.g., via text messaging, via an audio call, via a video call, etc. In some approaches, the notification may be a message, e.g., such as a text message. In some other approaches, the notification may be a call, e.g., an audio call, a video call, etc. In response to receiving the notification from the second communication device, an avatar associated with the second user may be displayed on an AR lens of the first communication device, e.g., see operation 204. In some approaches, the avatar is generated by the first communication device. In some other approaches, the first communication device may be paired with a mobile device of the first user and thereby receive a feed from the mobile device of the first user. In one or more of such approaches the avatar may be received by the first communication device from the mobile device, e.g., generated by the mobile device paired with the first communication device that is configured to gather telephonic direction information and identify details of each stored number and/or contact to generate an avatar of a user associated therewith, and will be identifying details of each stored number/contact, received by the mobile device and relayed in a feed to the first communication device, etc. Generation of the avatar may be based on at least some user characteristics, e.g., known and saved in a table on a memory module of the first communication device, generated using by a processing circuit based on a known picture of the second user using techniques that would become apparent to one of ordinary skill in the art upon reading various of the descriptions herein, etc. In some approaches, the avatar of the second user may be generated based on input received from the first user, e.g., answers to questions posed to the first user about the second user. In some other approaches, the avatar may be received by the first communication device from the second communication device of the second user. Note that in some of such approaches, the avatar may be included in the notification received from the second communication device. In contrast, in some other approaches, the first communication device may be received separately from the notification, e.g., such as in response to a request for avatars that is output to a plurality of contacts stored in a list of the first communication device. In some approaches, a human avatar may be generated for every contact stored in a directory known and/or local to the first communication device. In some approaches, social media platforms associated with the phone numbers of users may be utilized to create the avatars. In some approaches, upon receiving the notification, the first communication device may recognize a user associated with the notification, e.g., a second user, and create an avatar of the identified user. However, in some approaches, the notification may be received from an unknown number. In one or more of such approaches, a default avatar that is predetermined to be associated with an unknown user may be generated and displayed on the AR lens.

Generation of the avatar may in some approaches be based on prior communications with the communication device from which the notification is received. For example, in response to a determination that the communication device from which the notification is received has had at least a predetermined threshold degree of prior communication with the first communication device, the avatar may be generated to include, e.g., relatively brighter color clothing, be displayed relatively larger in size on the AR lens, perform a relatively more elaborate and thereby relatively more noticeable act on the AR lens, etc. In contrast, in response to a determination that the communication device from which the notification is received has not had at least a predetermined threshold degree of prior communication with the first communication device, the avatar may be generated to include, e.g., relatively duller color clothing, be displayed relatively smaller in size on the AR lens, perform a relatively less elaborate and thereby relatively less noticeable act on the AR lens, etc.

In some preferred approaches, the generated avatar performs an act while displayed on the AR lens of the first communication device. In other words, the avatar may at least temporarily perform an act and not be stationary. The avatar may additionally and/or alternatively be at least temporarily stationary while displayed on the AR lens of the first communication device, e.g., so as to not distract the first user that is looking through the AR lenses. In some approaches in which the avatar performs an act while displayed on the AR lens of the first communication device, the act that the avatar is displayed to perform may depend on the type of the notification that is received. For example, assuming that the notification is an invitation for the first communication device to enter a call with the second communication device, the avatar may depict the second user, e.g., waving, knocking, holding a phone up to their ear, pointing to a phone, making a phone hand gesture and holding the gesture up to their ear, etc., to infer that the second user is trying to interact with the first user. Such an act may in some approaches be based on actual actions that the second user is actively performing. In another example, assuming that the notification is an invitation for the first communication device to enter a video call with the second communication device, the avatar may depict the second user, e.g., waving, knocking, holding a video camera or phone in front of their face, pointing to a video calling application, etc. In yet another example, assuming that the notification is an invitation for the first communication device to enter a text conversation with the second communication device, e.g., respond to a text message, the avatar may depict the second user, e.g., waving, knocking, holding a phone with a keyboard in front of them, pointing to a messaging application, pretending to type such as by "airtyping," etc. In another approach, assuming that the notification is an invitation for a calendar invitation, the avatar may depict the second user, e.g., pointing to a calendar, pointing to their watch, waving, knocking, pointing to a planner application, etc. In some approaches, an avatar of the first user may also be generated and be displayed interacting with the second user on the AR lenses.

In some approaches, the avatar may be displayed on the AR lens of the first communication device for a predetermined period of time and/or every predetermined amount of time. This may prevent the user from becoming distracted in the event that the user ops to not address the avatar. Note that interaction with the avatar will be described in greater detail elsewhere below. For safety purposes, the avatar may be displayed on the AR lens of the first communication device at a quality and brightness that allows the user to partially view through the avatar so as to prevent a line of sight of objects in front of the user from being obstructed. Note that in response to a determination that the user is at least temporarily immobilized, e.g., sitting down, laying down, in bed, sitting at a desk during predetermined work hours, etc., the avatar may be displayed on the AR lens of the first communication device at a quality and brightness that optionally does not allow the user to partially view through the avatar. Of course, the quality and brightness of the avatar may in some approaches be adjusted, e.g., based on input received from the first user.

For context, in some approaches, the avatar being displayed on the AR lens and/or performing the act indicates that the second user is trying to reach the first user, e.g., for a phone call, for a video call, for a text conversation, etc. It may be determined whether the first user wishes to accept such an invitation and/or whether the user would prefer to, at least at a current time, not accept the invitation. Accordingly, in some preferred approaches, the first user is monitored for a predetermined gesture, e.g., see operation 206. Note that any monitoring performed in various embodiments and approaches described herein is preferably performed subsequent to gaining permission from the user that is being monitored. Such monitoring may be performed in order to determine whether the user has performed at least one predetermined gesture, e.g., see decision 208. The type of monitoring that is performed for determining whether the user has performed at least one predetermined gesture may depend on settings of the first communication device. For example, in some approaches, the first communication device may be configured to monitor for gestures made by one or more limbs of the first user's body. In such approaches, the monitoring may be performed by the first communication device, e.g., using at least one camera of the first communication device, using movement sensors of the first communication device, using a wearable device of the user that is paired with the first communication device and configured to track hand gestures of the user, using a type of monitoring that would become apparent to one of ordinary skill in the art upon reading various descriptions herein, etc. In some other approaches, the monitoring may be performed by another device, and data associated with the monitoring performed may be received by and analyzed by the first communication device in order to determine whether the first user performs a predetermined gesture. Assuming that the first predetermined gesture is a gesture made by at least one limb of the first user's body, according to various approaches, the gesture may include any one or more of the user, e.g., snapping their fingers, waving a hand, shaking their finger, swiping their arm in a predetermined direction, kicking their leg, tapping their foot, swiping their foot in a predetermined direction, crossing their leg(s), crossing their fingers, etc.

As will be described in greater detail elsewhere herein, in some approaches, more than one avatar may be displayed on the AR lens. For example, a first avatar displayed on the AR lens may represent the received notification and a second avatar displayed on the AR lens may represent the notification received by the first communication device. Accordingly, in some approaches, the first predetermined gesture may additionally and/or alternatively be a gesture made by the at least one limb of the first user's body while at least one of the first user's eyes is focused on the avatar, e.g., the avatar that the user intends the gesture to correspond to. For context, the term "focused" may depend on the approach. For example, focusing on an avatar displayed on the AR lens may be based on a determination that the user, e.g., has looked at the avatar for at least a predetermined threshold amount of time; is currently looking at the avatar; is looking at the avatar during a time that the user performs the gesture; performs a predetermined eye movements with respect to the avatar such as winking, squinting, or blinking a predetermined pattern with at least one of the user's eyes; etc. Techniques that would become apparent to one of ordinary skill in the art upon reading various of the descriptions herein for tracking an eye of a user to determine focus of at least one of the user's eyes with respect to the AR lens may be used for determining an avatar that the user intends to perform non-verbal communication with.

In some approaches, the first predetermined gesture is additionally and/or alternatively a gesture made by at least one of the first user's eyes. For example, according to various approaches, the first predetermined gesture may include at least one of, e.g., blinking, winking, squinting, enlarging at least one of the first user's eyes, blinking a predetermined pattern of blinks, "rolling eyes," looking at the avatar for a predetermined amount of time, performing a predetermined blink pattern while focusing on the avatar and then traversing focus to different predetermined portion of the AR lens, etc. The predetermined gesture may additionally and/or alternatively include changing focus from one avatar to another avatar. For example, assuming that a call is not merged, at any point of time, it may be determined that the first user changes their focus from one calling party avatar to another calling party avatar in the AR lens, and accordingly one calling party may be placed on hold and a call may be initiated to the other calling party. The first predetermined gesture may additionally and/or alternatively include, e.g., voice commands detected by the first communication device, touch selections determined to be received on the AR lens by the user, etc.

The predetermined gesture may be one of a plurality of predetermined gestures. In response to a determination that the first user has not performed a predetermined gesture, e.g., as illustrated by the "No" logical path of decision 208, monitoring for a predetermined gesture may optionally continue for a predetermined amount of time.

The predetermined gesture may be one of a plurality of predetermined gestures. In some preferred approaches, at least some of the predetermined gestures correspond to actions to be taken by the first communication device in response to a determination that the first user has performed one or more of the predetermined gestures. For example, in response to a determination that the first user has performed a predetermined gesture, e.g., as illustrated by the "Yes" logical path of decision 208, an action associated with the first predetermined gesture may be determined and performed by the first communication device in order to respond to the notification, e.g., see operation 210.

In some approaches, the first communication device may be a party to a current call, e.g., a voice call, a video call, etc., with a third communication device when the notification from the second communication device is received. In some of such approaches, the action associated with the first predetermined gesture may include, e.g., merging the second communication device into the call currently being conducted between the first communication device and the third communication device, outputting an instruction to a cell phone paired with the first communication device to merge the second communication device into the call currently being conducted between the first communication device and the third communication device, dropping the call currently being conducted between the first communication device and the third communication device and establishing a call between the first communication device and the second communication device, updating the AR lens to not include the avatar associated with the second user and/or an avatar associated with a third user of the third communication device, requesting that the second user wait for any specified time, instructing the second user to call the first user back, holding a current phone call, canceling a current call, etc. The action associated with the first predetermined gesture may be selected from the group consisting of: merging the first second communication device into a call that being conducted between the first communication device and a third communication device, dropping a call that is being conducted between the first communication device and a third communication device, establishing a call between the first communication device and the second communication device, scheduling a call between the first communication device and the second communication device, generating a message to the first communication device, generating a second avatar to output to the first communication device, and placing a third communication device on hold. The action associated with the first predetermined gesture may additionally and/or alternatively include scheduling a call between the first communication device and the second communication device at a later time, generating a reply message to the first communication device, generating a second avatar to output to the first communication device with a predetermined act, placing the third communication device on hold, etc.

In contrast to various approaches described above, in some cases the first communication device is not communicating with a third communication device when the notification from the second communication device is received, e.g., is not currently engaged in a voice call; is not currently engaged in a video call; is not actively drafting and/or sending a message such as SMS, an email, etc. Accordingly, in one or more of such approaches, the action associated with the first predetermined gesture may directly correspond with communication between the first communication device and the second communication device, e.g., as opposed to additionally and/or alternatively potentially corresponding to a third communication device. For example, the first predetermined gesture may be associated with an action that includes not accepting the invitation for the first communication device to enter into a communication session with the second communication device, e.g., enter into a call, enter into a video session, enter into a message exchange session, etc. A user may elect to not accept the invitation in response to being preoccupied, e.g., in a training session while the notification is received.

In some approaches, a response associated with the first predetermined gesture may optionally be generated, e.g., see operation 212. The response associated with the first predetermined gesture in some preferred approaches indicates an availability of the first user to communicate with the second user. It may be assumed for purposes of an example that the first communication device is currently on a call with a third communication device, and that, subsequent to receiving the notification from the second communication device and displaying the avatar associated with the second user on the AR lens of the first communication device, it is determined that the user performs a predetermined gesture. It may also be assumed that the predetermined gesture is associated with an action that includes electing to not merge the second communication device into the call with the third communication device, and instead forward the second communication device to a voicemail account of the first communication device. In such an example, the generated response associated with the predetermined gesture may indicate an availability of the first user to communicate with the second user include. For example, the generated response may include a cartoon avatar character that is modeled of the first user and holds a card that indicates an estimated about of time that first user has left in the scheduled call that the first communication device is currently on with the third communication device. This avatar may be displayed on an AR lens of the second communication device for the second user. This way, gesture-based communication of the first user may be translated to the user device of the second user. In another example, the generated response may include available time slots in a calendar of the first user, which may be reserved by the second communication device. Such a reservation may be relayed from the second communication device to the first communication device thereafter. An availability of a user with respect to ongoing activities may in some approaches be derived based on one or more data sources, e.g., a calendar, communications, social media, visual monitoring, etc., provided that the first user has given consent to review such data sources.

Operation 214 includes outputting the response associated with the first predetermined gesture. In some approaches, the response may be output to a device from which the notification is received, e.g., the second communication device. In another approach, the response may be output to another device that relays the response to the second device.

Various approaches described below detail operations that may be performed with respect to a notification received from a third communication device. For context, these operations detail that various operations of method 201 may be performed in view of a plurality of notifications potentially being received.

Operation 216 includes receiving, on the first communication device, a second notification from a third communication device of a third user. In response to receiving the second notification from the third communication device of the third user, a second avatar associated with the third user may be displayed on the AR lens, e.g., see operation 218. Techniques described elsewhere herein for generating an avatar may be utilized for generating the second avatar. Displaying the second avatar on the AR lens may in some approaches include adding the second avatar next to the first avatar, e.g., based on the second communication device and the third communication device being devices that are requesting a communication session with the first communication device. In response to a determination that the first notification is of a same type as the second notification, e.g., both requests for calls with the first communication device, the first avatar and the second avatar may be placed in a same grouping indicator displayed on the AR lens, e.g., a circle around avatars, a predetermined display area of the AR lens, a card held by the avatar indicating a type of request, etc. In contrast, assuming that the first action has resulted in the first avatar being cleared from the AR lens, e.g., such as in response to the first action being associated with not accepting a call from the second communication device, the second avatar may be displayed on the AR lens at about a location that the first avatar was previously displayed.

The first user is monitored for a predetermined gesture, e.g., see operation 220. In operation 222 it is determined whether the user has performed at least one predetermined gesture, e.g., hereafter a "second predetermined gesture." The second predetermined gesture may include any of the gestures described elsewhere above. In response to a determination that the first user has not performed a second predetermined gesture, e.g., as illustrated by the "No" logical path of decision 222, the monitoring may optionally continue for a predetermined amount of time. In contrast, in response to a determination that the first user has performed the second predetermined gesture, e.g., as illustrated by the "Yes" logical path of decision 222, an action associated with the second predetermined gesture may be performed by the first communication device, e.g., see operation 224. For example, assume that the notification received from the second communication device is an invitation for the first communication device to enter a call with the second communication device, and that the action associated with the first predetermined gesture includes accepting the invitation for the first communication device to enter the call with the second communication device. In some approaches, in response to a determination that the first user performs a second predetermined gesture the first communication device may perform an action associated with the second predetermined gesture. In the current example, the action associated with the second predetermined gesture may include adding the third communication device to the call between the first communication device and the second communication device, e.g., merging. In such an example, the second predetermined gesture may include the user focusing on the second avatar and making a motion, e.g., a hand motion, a head nod, an eye scan, etc., toward the first avatar.

Operation 226 includes generating a response associated with the second predetermined gesture, e.g., hereafter referred to as a "second response." The second response may be output, e.g., to the third communication device, in operation 228. The second response is preferably associated with the second predetermined gesture, and may indicate an availability of the first user to communicate with the third user.

Numerous benefits are enabled as a result of utilizing one or more of the novel techniques described in various embodiments and approaches described herein. For example, as a result of displaying an avatar on an AR lens of a first communication device in response to receiving a communication notification from a second communication device, a user of the first device is not distracted from a current communication session. This distraction would otherwise occur in the event that the first user pulled a communication device, e.g., such as a cellular phone, out to review the notification. As a result, a relative efficiency of a user's day and utilization of the user's communication device is increased, as the user is able to review the notification in an AR lens of a communication device worn by the user of the first communication device. Note that these actions are optionally all performed touch free, e.g., other than the first communication device potentially touching the user based on being worn by the user. This also allows the user of the first communication device to avoid mistakenly taking some rude actions when speaking face to face with another person while the notification is received on the first user's first communication device. For example, many people today habitually and/or for reasons of work related commitments pause face to face conversations with other people in response to receiving a call on their phone which may be stored in their pocket. This is problematic in that the party already in the face to face conversation may feel not prioritized and/or heard as the user checks their phone. However, using the techniques in various embodiments and approaches described herein, a second user likely never realizes that a first user responded to a notification received on a first communication device worn by the first user. This is because the first user is able to realize avatars on one or more AR lenses and utilize gestures to perform actions associated with the gestures. Benefits enabled as a result of utilizing one or more of the novel techniques described in various embodiments and approaches described herein furthermore include a relative reduction in processing performed by computer devices. This is because a plurality of notifications may be simultaneously displayed and manipulated by user gestures on the AR lens rather than the user having to perform a series of hold and transfers and other handheld device display narrations to respond to incoming notifications as is performed using a conventional cellular phone. It should furthermore be noted that use of avatar on an AR lens of a communication device and gestures associated with actions has heretofore not been considered within conventional techniques for operating communication devices. Accordingly, the inventive discoveries disclosed herein proceed contrary to conventional wisdom.

These beneficial techniques may in some approaches be offered via licensing within the telecom space by providing this interactive facility to subscribers. Furthermore, these techniques may be offered to clients in the telecom industry as a service to subscribers or buyers, e.g., where the implementing company is associated with phone software development. Subscriptions to such services enable value for end users. For example, end users use the relatively intuitive AR based user interface (UI) to interact with callers. In some approaches, user devices may be offered a library of avatars to purchase for customizing one or more of the avatars displayed on communication devices.

FIGS. 3A, 3C, 3E, 3G, 3I and 3K depict a communication environment 300 and FIGS. 3B, 3D, 3F, 3H, 3J and 3L depict a first communication device 304 of the communication environment 300 in accordance with several embodiments. As an option, the present communication environment 300 and the present first communication device 304 may be implemented in conjunction with features from any other embodiment listed herein, such as those described with reference to the other FIGS. Of course, however, such communication environment 300 and first communication device 304 and others presented herein may be used in various applications and/or in permutations which may or may not be specifically described in the illustrative embodiments listed herein. Further, the communication environment 300 and first communication device 304 presented herein may be used in any desired environment.

It may be prefaced that FIGS. 3A-3L illustrate how a communication device of a user can visualize a first calling party, while having a call with a second calling party, and with gesture based communication communicate with the first calling party.

Figure 3A:
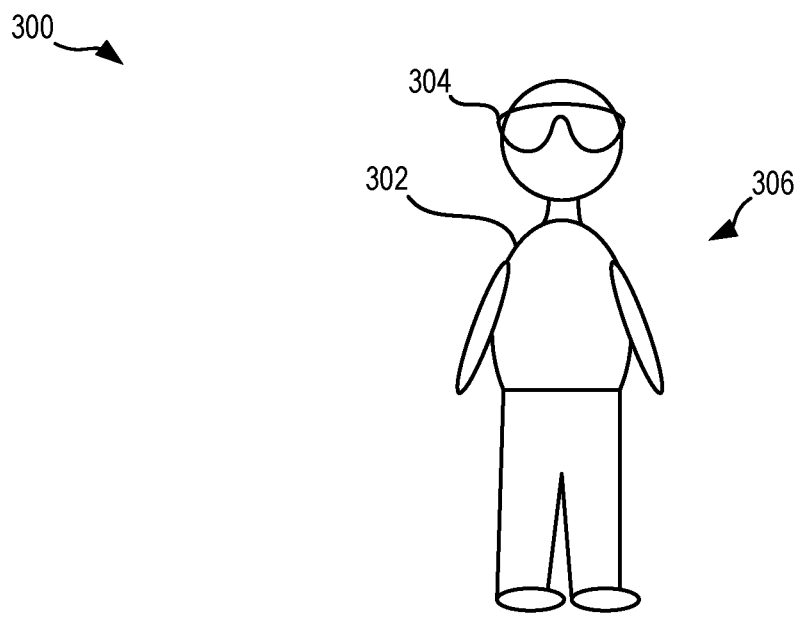
FIG. 3A depicts a communication environment, in accordance with one embodiment of the present invention.
Figure 3B:
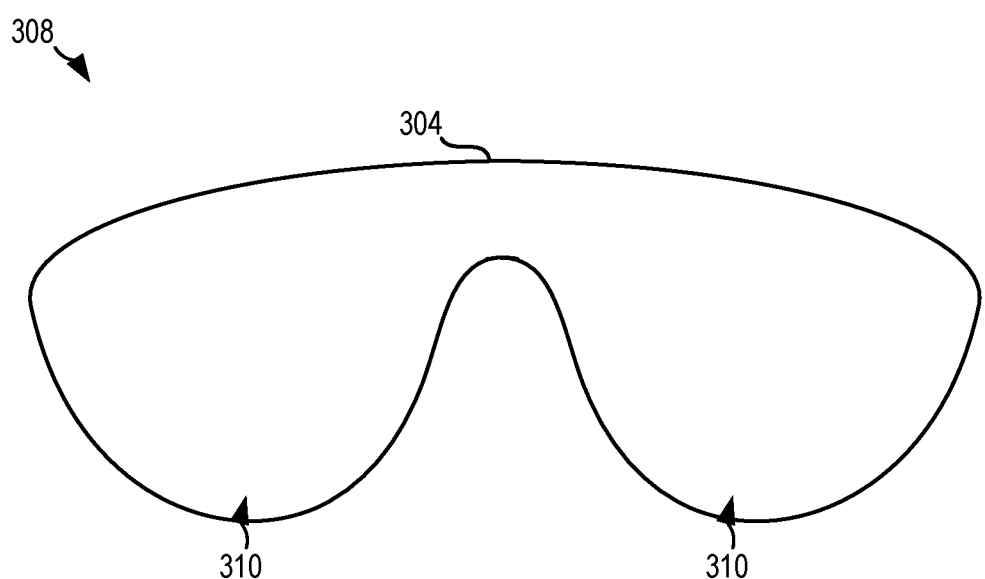
FIG. 3B depicts a perspective of AR lenses of a communication device of the communication environment in FIG. 3A, in accordance with one embodiment of the present invention.

Referring first to FIG. 3A, the communication environment 300 includes a first user 302 wearing a first communication device 304. Furthermore, it may be noted that the first user 302 is in a first stance 306, e.g., standing with arms down at their side, in FIG. 3A. Referring now to FIG. 3B, a perspective of the communication device 304 is depicted. The first communication device 304 includes two AR lenses 310 in the current approach, although in some other approaches a configuration of the first communication device 304 may vary, e.g., such as where the first communication device only include a single AR lens configured to be worn in front of one of the first user's eyes. For example, according to various approaches, the first communication device may include, e.g., an ear loop, a hear strap, an adhesive, etc., to position the AR lenses 310 of the first communication device 304 about in front of at least one eye of the first user 302. It may be noted that in FIG. 3B, nothing is yet displayed on the AR lenses 310 of the first communication device 304. Accordingly, the user 302 may look through the AR lenses 310 and see what is in front of them.

Figure 3C:
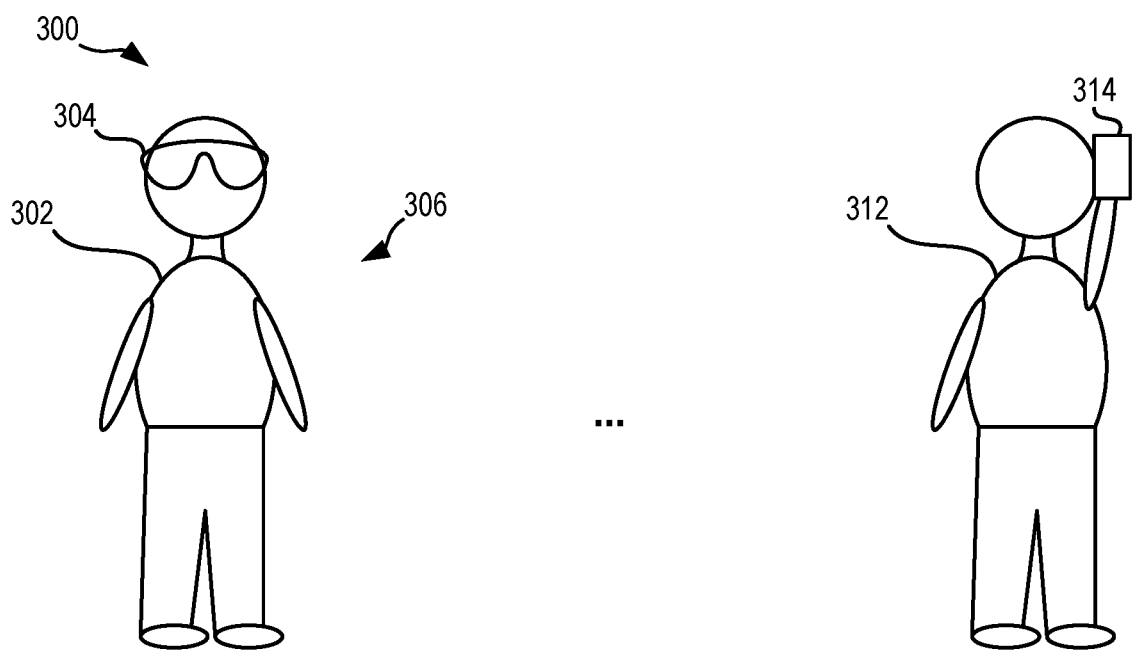
FIG. 3C depicts the communication environment of FIG. 3A, in accordance with one embodiment of the present invention.
Figure 3D:
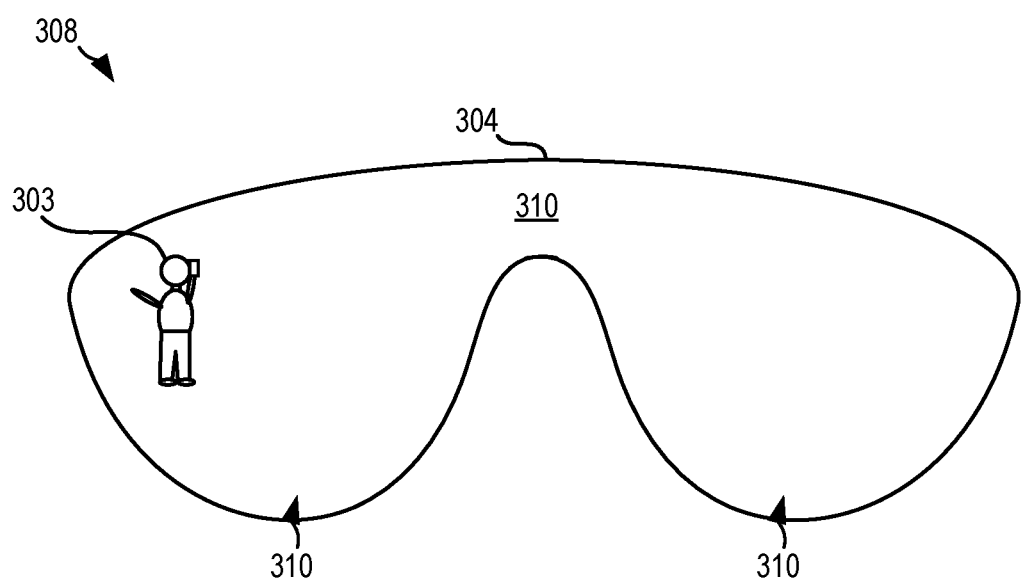
FIG. 3D depicts a perspective of AR lenses of the communication device of the communication environment in FIG. 3C, in accordance with one embodiment of the present invention.

In FIG. 3C, the communication environment 300 includes a second user 312 that sends a notification, e.g., a request to join on a call with the first user 302, to the first communication device 304 via a second communication device 314. In some approaches the first user 302 and the second user 312 may be geographically distant, e.g., in different towns, in different countries, etc., from one another. In response to receiving, on the first communication device 304 worn by the first user 302, the notification from the second communication device 314 of the second user 312, an avatar 303 associated with the second user 312 is displayed on one of the AR lenses 310 of the first communication device 304, e.g., see FIG. 3D. In one approach the avatar 303 may perform an act to catch the attention of the first user 302, e.g., see the avatar 303 waving their arm.

Figure 3E:
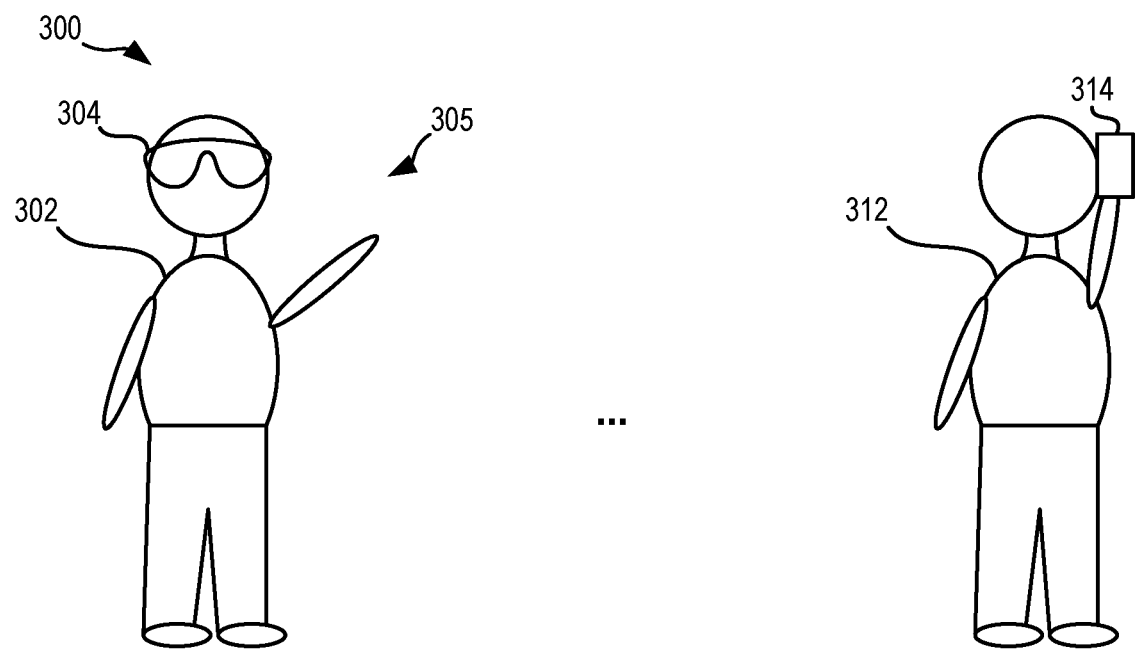
FIG. 3E depicts the communication environment of FIGS. 3A and 3C, in accordance with one embodiment of the present invention.
Figure 3F:
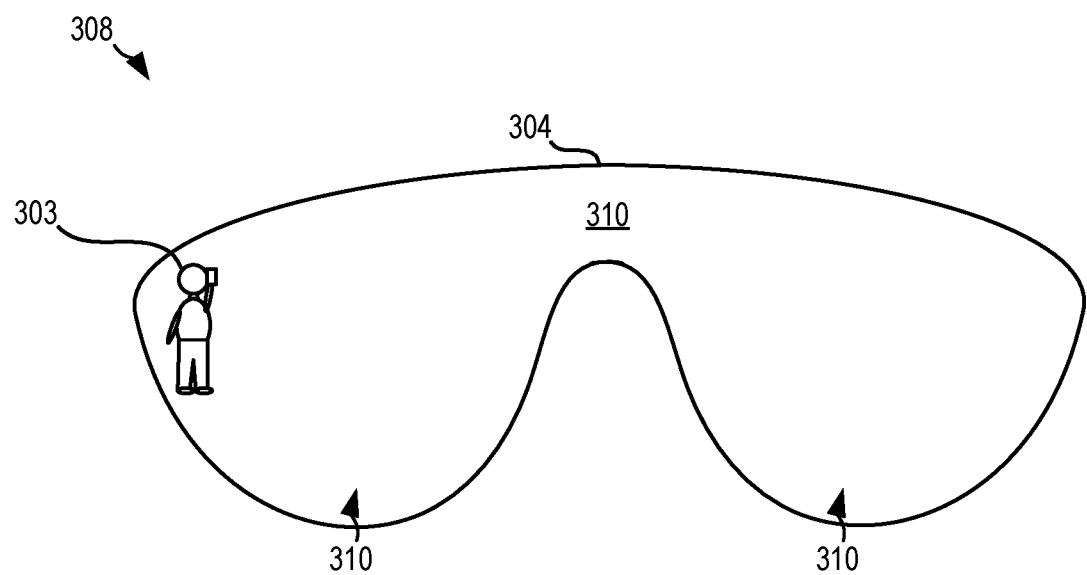
FIG. 3F depicts a perspective of AR lenses of the communication device of the communication environment in FIG. 3E, in accordance with one embodiment of the present invention.

Referring now to FIG. 3E, the first user 302 is monitored for a predetermined gesture. For example, it may be determined that the user 302 performs a first predetermined gesture 305 that includes raising their hand while focusing on the avatar 303 associated with the second user 312 displayed on one of the AR lenses 310 of the first communication device 304. In response to a determination that the first user 302 performs the first predetermined gesture 305, an action associated with the first predetermined gesture 305 is performed by the first communication device 304. For example, in some approaches the action associated with the first predetermined gesture 305 includes accepting a call between the first communication device 304 and the second communication device 314. A response associated with the first predetermined gesture 305 may additionally and/or alternatively be output by the first communication device 304 to the second communication device 314. In FIG. 3F, the avatar 303 is updated to not perform the act, e.g., based on the action associated with the first predetermined gesture 305 being performed, and is instead positioned at an outer edge of one of the AR lenses 310. Note that in another approach, the avatar may alternatively be positioned on a different one of the AR lenses 310.

Figure 3G:
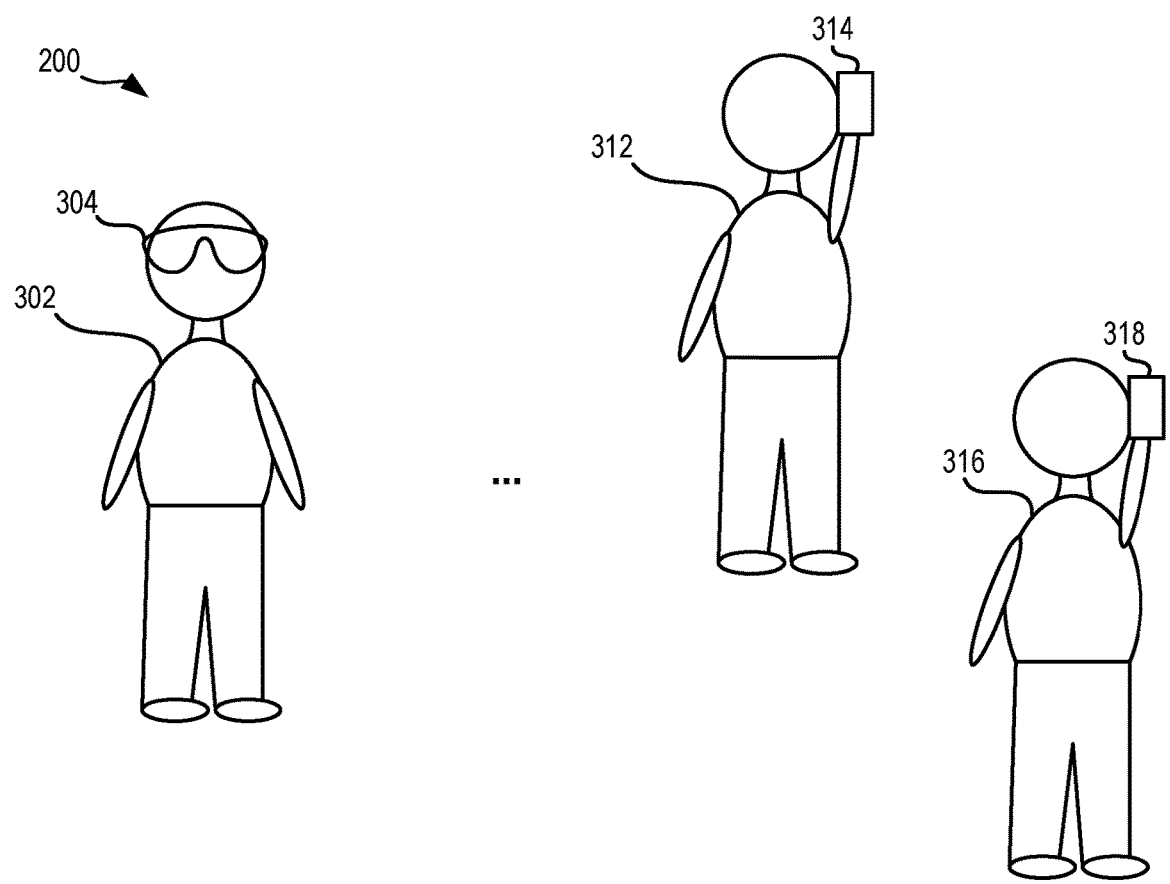
FIG. 3G depicts the communication environment of FIGS. 3A, 3C and 3E, in accordance with one embodiment of the present invention.
Figure 3H:
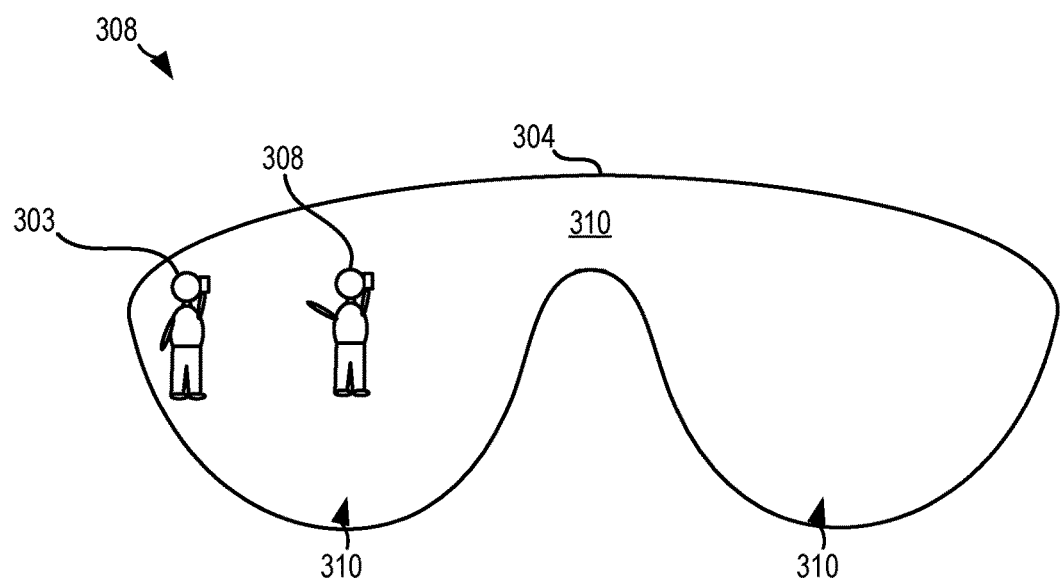
FIG. 3H depicts a perspective of AR lenses of the communication device of the communication environment in FIG. 3G, in accordance with one embodiment of the present invention.

A second notification is received by the first communication device 304 from a third communication device 318 of a third user 316 in FIG. 3G. In some approaches, the second notification is a request to join on a call with at least the first user 302. In response to receiving, on the first communication device 304 worn by the first user 302, the second notification from the third communication device 318 of the third user 316, an avatar 308 associated with the third user 316 is displayed on the AR lenses 310 of the first communication device 304, e.g., see FIG. 3H. In one approach, the avatar 308 may perform an act to catch the attention of the first user 302, e.g., see the avatar 308 waving their arm.

Figure 3I:
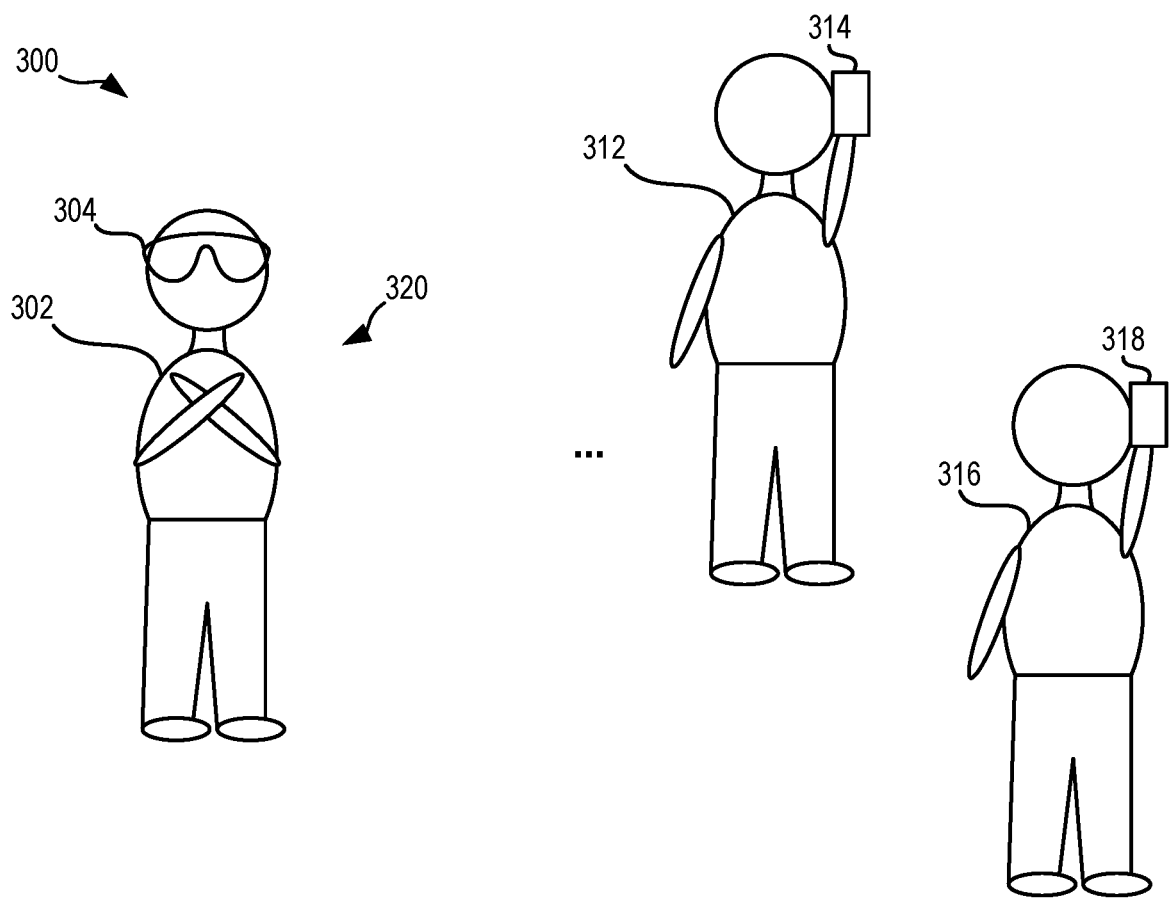
FIG. 3I depicts the communication environment of FIGS. 3A, 3C, 3E and 3G, in accordance with one embodiment of the present invention.
Figure 3J:
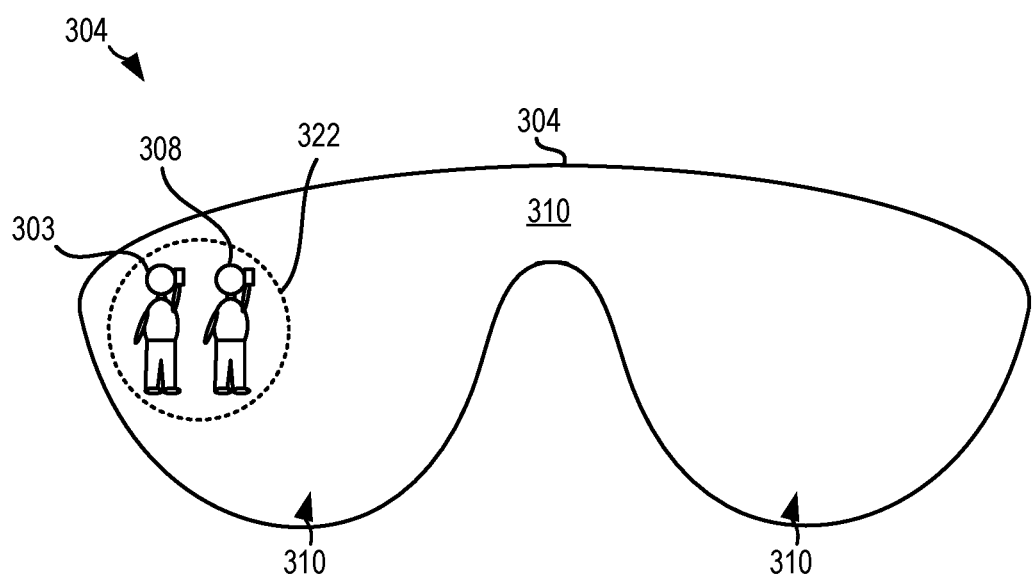
FIG. 3J depicts a perspective of AR lenses of the communication device of the communication environment in FIG. 3I, in accordance with one embodiment of the present invention.

Referring now to FIG. 3I, the first user 302 is monitored for a predetermined gesture. The first user 302 is able to interact with the third user's avatar 308 using gestures, e.g., hand gestures, eye gestures, etc., while continuing the spoken conversation with the second user 312. For example, it may be determined that the user 302 performs a second predetermined gesture 320 that includes crossing their arms while focusing on the avatar 308 associated with the third user 316 displayed on one of the AR lenses 310 of the first communication device 304. In response to a determination that the first user 302 performs the second predetermined gesture 320, an action associated with the second predetermined gesture 320 is performed by the first communication device 304. For example, in some approaches the action associated with the second predetermined gesture 320 includes adding the third communication device 318 to the call between the first communication device 304 and the second communication device 314. A response associated with the second predetermined gesture 320 may additionally and/or alternatively be output by the first communication device 304 to the third communication device 316. In FIG. 3J, the avatar is updated to not perform the act, e.g., based on the action associated with the second predetermined gesture 320 being performed, and is instead positioned at the outer edge of one of the AR lenses 310 with the avatar 303. Furthermore, the avatar 303 and the avatar 308 are grouped together, e.g., grouping indicated by a ring 322 displayed on one of the AR lenses 310, to indicate the members of the call. According to a more specific approach, the gesture 320 may include interacting with the avatar 308 to merge a calling party into a call. For example, in response to a determination that the first user 302 is focusing on the avatar 308 and the first user 302 is swiping their hand and/or eyes in a direction towards the avatar 303, the third communication device 318 may be merged with the call being already performed. The user may additionally and/or alternatively perform non-verbal communication with any avatar displayed in the AR lens. Such non-verbal communication is translated into an associated action that is performed and/or relayed to the calling party, e.g., users associated with the avatars.

Figure 3K:
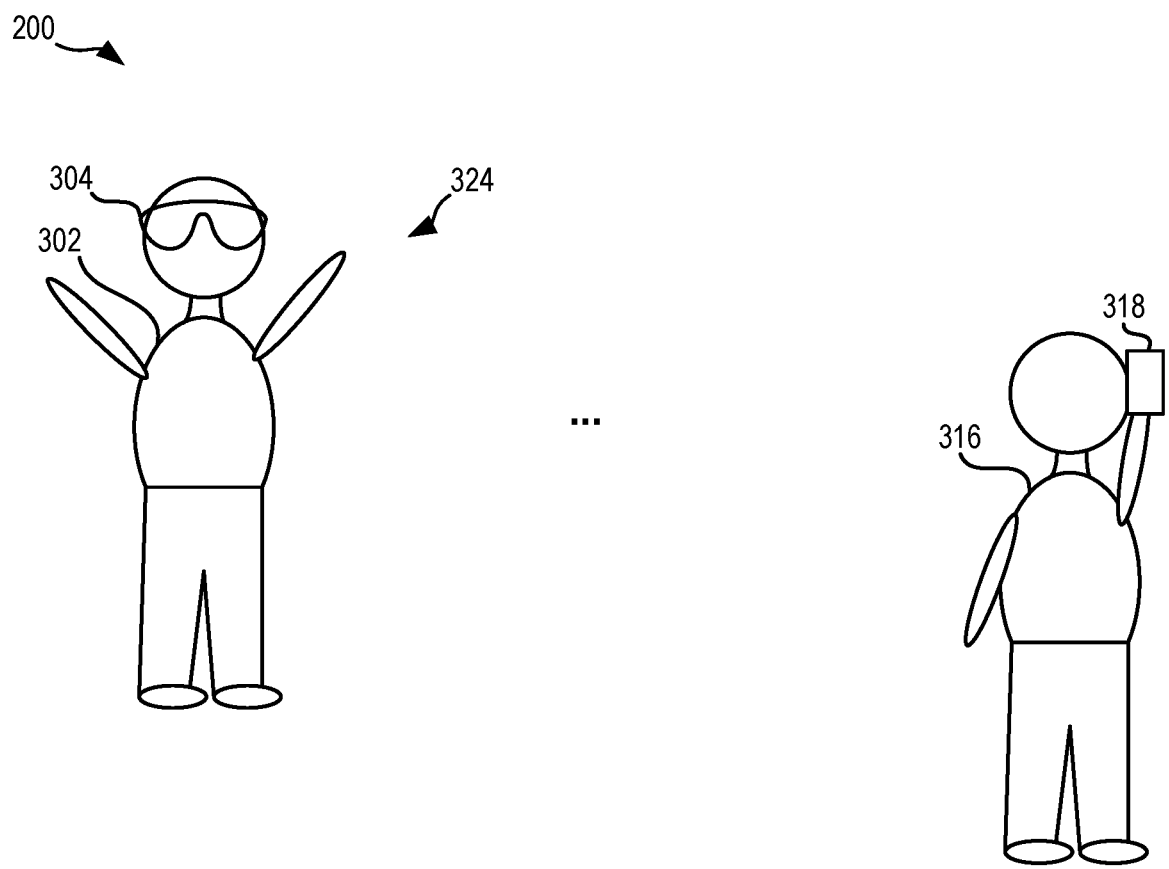
FIG. 3K depicts the communication environment of FIGS. 3A, 3C, 3E, 3G and 3I, in accordance with one embodiment of the present invention.
Figure 3L:
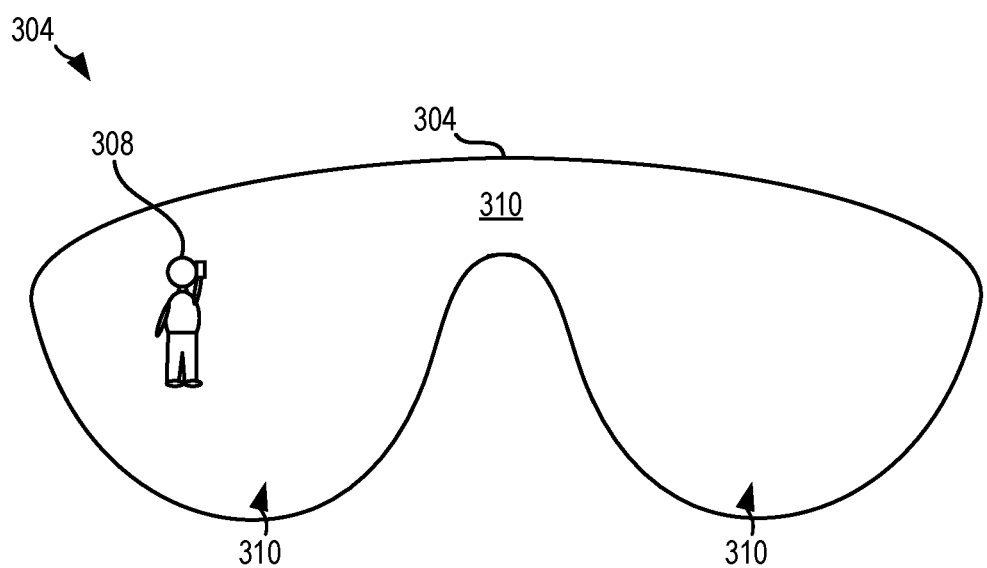
FIG. 3L depicts a perspective of AR lenses of the communication device of the communication environment in FIG. 3K, in accordance with one embodiment of the present invention.

It may be noted that despite the avatars 303, 308, being displayed on one of the AR lenses 310, monitoring the first user for a predetermined gesture may continue, e.g., for a predetermined amount of time, indefinitely, until a predetermined number of avatars are removed from the AR lenses 310, etc. Referring now to FIG. 3K, it may be determined that the first user 302 performs a third predetermined gesture 324 that includes the first user 302 holding their arms up while focusing on the avatar 303 on one of the AR lenses 310. In response to a determination that the first user performs the third predetermined gesture 324, an action associated with the third predetermined gesture 324 may be performed by the first communication device 304. For example, the action associated with the third predetermined gesture 324 may include dropping the second communication device from the call, e.g., see the second user not present in the communication environment 300 of FIG. 3K. Furthermore, referring to FIG. 3L, the avatar 308 associated with the third user 316 is not displayed on the AR lenses 310 of the first communication device 304 in accordance with the action being performed.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
in response to receiving, on a first communication device worn by a first user, a notification from a second communication device of a second user, displaying an avatar associated with the second user on an augmented reality (AR) lens of the first communication device, wherein the avatar associated with the second user performs a nonstationary act while displayed on the AR lens of the first communication device;
monitoring the first user for a predetermined gesture;
in response to a determination that the first user performs a first predetermined gesture, performing, by the first communication device, an action associated with the first predetermined gesture,
wherein the action associated with the first predetermined gesture places the avatar associated with the second user in a first grouping indicator with an avatar associated with a third user, the first grouping indicator comprising a ring displayed on an outer edge of the AR lens; and
outputting a response associated with the first predetermined gesture.

2. The computer-implemented method of claim 1, wherein the first communication device is a party to a call with a third communication device worn by the third user when the notification from the second communication device is received.

3. The computer-implemented method of claim 2, the computer-implemented method further comprising: translating non-verbal communication of the first user into an associated action; and relaying the associated action to the third communication device and the second communication device.

4. The computer-implemented method of claim 1, wherein the first predetermined gesture is a gesture made by at least one limb of the first user's body.

5. The computer-implemented method of claim 4, wherein the first predetermined gesture further includes at least one of the first user's eyes being focused on the avatar associated with the second user for a predetermined threshold amount of time.

6. The computer-implemented method of claim 1, wherein the first predetermined gesture is a gesture made by at least one of the first user's eyes, wherein the first predetermined gesture includes performing a predetermined blinking pattern during the at least one of the first user's eyes being focused on the avatar associated with the second user.

7. The computer-implemented method of claim 1, wherein the action associated with the first predetermined gesture merges the second communication device into a call that being conducted between the first communication device and a third communication device.

8. The computer-implemented method of claim 1, wherein the notification is an invitation for the first communication device to enter a call or a text conversation with the second communication device, wherein the nonstationary act is a temporary act which includes the avatar associated with the second user using a phone inviting the first user to use a phone to communicate with the second user or pretending to type inviting the first user to type to communicate with the second user, wherein the nonstationary act is followed by the avatar associated with the second user remaining stationary while displayed on the AR lens.

9. The computer-implemented method of claim 8, wherein the action associated with the first predetermined gesture includes accepting the invitation for the first communication device to enter the call with the second communication device, and comprising:
 in response to receiving, on the first communication device, a second notification from a third communication device of a fourth user, displaying a second avatar associated with the fourth user on the AR lens;
 monitoring the first user for a predetermined gesture;
 in response to a determination that the first user performs a second predetermined gesture, performing, by the first communication device, an action associated with the second predetermined gesture; and
 outputting a second response associated with the second predetermined gesture, wherein the second response indicates an availability of the first user to communicate with the fourth user,
 wherein the second response indicates an estimated amount of time that first user has left in a call that the first user is currently on.

10. A computer program product, the computer program product comprising a computer readable storage medium having program instructions embodied therewith, the program instructions readable and/or executable by a processing circuit to cause the processing circuit to:
 in response to receiving, on a first communication device worn by a first user, a notification from a second communication device of a second user, display, by the processing circuit, an avatar associated with the second user on an augmented reality (AR) lens of the first communication device,
 wherein the avatar associated with the second user performs a nonstationary act while displayed on the AR lens of the first communication device;
 monitor, by the processing circuit, the first user for a predetermined gesture;
 in response to a determination that the first user performs a first predetermined gesture, perform, by the processing circuit of the first communication device, an action associated with the first predetermined gesture,
 wherein the action associated with the first predetermined gesture places the avatar associated with the second user in a first grouping indicator with an avatar associated with a third user, the first grouping indicator comprising a ring displayed on an outer edge of the AR lens; and
 output, by the processing circuit, a response associated with the first predetermined gesture.

11. The computer program product of claim 10, wherein the first communication device is a party to a call with a third communication device worn by the third user when the notification from the second communication device is received.

12. The computer program product of claim 11, the program instructions readable and/or executable by the processing circuit to cause the processing circuit to: translate, by the processing circuit, non-verbal communication of the first user into an associated action; and relay, by the processing circuit, the associated action to the third communication device and the second communication device.

13. The computer program product of claim 10, wherein the first predetermined gesture is a gesture made by at least one limb of the first user's body.

14. The computer program product of claim 13, wherein the first predetermined gesture further includes at least one of the first user's eyes being focused on the avatar associated with the second user for a predetermined threshold amount of time.

15. The computer program product of claim 10, wherein the first predetermined gesture is a gesture made by at least one of the first user's eyes, wherein the first predetermined gesture includes performing a predetermined blinking pattern during the at least one of the first user's eyes being focused on the avatar associated with the second user.

16. The computer program product of claim 10, wherein the action associated with the first predetermined gesture merges the second communication device into a call that being conducted between the first communication device and a third communication device.

17. The computer program product of claim 10, wherein the notification is an invitation for the first communication device to enter a call or a text conversation with the second communication device, wherein the nonstationary act is a temporary act which includes the avatar associated with the second user using a phone inviting the first user to use a phone to communicate with the second user or pretending to type inviting the first user to type to communicate with the second user, wherein the nonstationary act is followed by the avatar associated with the second user remaining stationary while displayed on the AR lens.

18. The computer program product of claim 17, wherein the action associated with the first predetermined gesture includes accepting the invitation for the first communication device to enter the call with the second communication device, and the program instructions readable and/or executable by the processing circuit to cause the processing circuit to:
 in response to receiving, on the first communication device, a second notification from a third communication device of a fourth user, display, by the processing circuit, a second avatar associated with the fourth user on the AR lens;
 monitor, by the processing circuit, the first user for a predetermined gesture;
 in response to a determination that the first user performs a second predetermined gesture, perform, by the processing circuit of the first communication device, an action associated with the second predetermined gesture; and
 output, by the processing circuit, a second response associated with the second predetermined gesture, wherein the second response indicates an availability of the first user to communicate with the fourth user,
 wherein the second response indicates an estimated amount of time that first user has left in a call that the first user is currently on.

19. A system, comprising:
 a processor; and logic integrated with the processor, executable by the processor, or integrated with and executable by the processor, the logic being configured to:

in response to receiving, on a first communication device worn by a first user, a notification from a second communication device of a second user, display an avatar associated with the second user on an augmented reality (AR) lens of the first communication device, wherein the avatar associated with the second user performs a nonstationary act while displayed on the AR lens of the first communication device;

monitor the first user for a predetermined gesture;

in response to a determination that the first user performs a first predetermined gesture, perform, by the first communication device, an action associated with the first predetermined gesture, wherein the action associated with the first predetermined gesture places the avatar associated with the second user in a first grouping indicator with an avatar associated with a third user, the first grouping indicator comprising a ring displayed on an outer edge of the AR lens; and output a response associated with the first predetermined gesture.

20. The system of claim 19, wherein the first communication device is a party to a call with a third communication device worn by the third user when the notification from the second communication device is received.

* * * * *